US011992034B2

(12) United States Patent
Contreras et al.

(10) Patent No.: US 11,992,034 B2
(45) Date of Patent: May 28, 2024

(54) LOW SODIUM SALT COMPOSITION

(71) Applicant: Salarius Ltd., London (GB)

(72) Inventors: Javier Contreras, Alpharetta, GA (US); Victor Hugo Manzanilla, Boca Raton, FL (US)

(73) Assignee: MICROSALT LTD., London (GB)

( * ) Notice: Subject to any disclaimer, the term of this patent is extended or adjusted under 35 U.S.C. 154(b) by 0 days.

(21) Appl. No.: 18/175,028

(22) Filed: Feb. 27, 2023

(65) Prior Publication Data
US 2023/0217973 A1 Jul. 13, 2023

Related U.S. Application Data

(63) Continuation of application No. 16/535,703, filed on Aug. 8, 2019, now abandoned.

(51) Int. Cl.
*A23L 27/40* (2016.01)
*A23L 3/46* (2006.01)
*A23L 7/122* (2016.01)
*A23L 19/18* (2016.01)
*A23L 25/00* (2016.01)

(52) U.S. Cl.
CPC ............... *A23L 27/40* (2016.08); *A23L 3/46* (2013.01); *A23L 7/122* (2016.08); *A23L 19/18* (2016.08); *A23L 25/25* (2016.08); *A23V 2002/00* (2013.01)

(58) Field of Classification Search
CPC .......... A23L 19/18; A23L 25/25; A23L 7/122; A23L 3/46
See application file for complete search history.

(56) References Cited

U.S. PATENT DOCUMENTS 8,900,650 B1 * 12/2014 Wang ................. A23L 27/40
426/573

* cited by examiner

*Primary Examiner* — Katherine D Leblanc
(74) *Attorney, Agent, or Firm* — Ellenoff Grossman & Schole LLP; John Stellabotte; Danielle Cohen

(57) ABSTRACT

Salt particles adhered to a bulk carrier of the present invention are improved over prior alternative salts by having smaller salt particles adhered to a bulk carrier are achieved through modifications of variables for production of salt adhered to carrier particles, including starting solid composition, salt-carrier slurry composition, inlet and outlet drying temperature, slurry temperature, and moisture content control. The resulting salt-carrier product of salt adhered to carrier particles can be produced with much smaller salt particles of about 100 nanometers to less than 2 microns adhered to a carrier, which in turn improves electrostatic forces that help the salt-carrier product better adhere to and coat a food product than salts not adhered to a carrier particle.

20 Claims, 2 Drawing Sheets

LOW SODIUM SALT COMPOSITION

CROSS-REFERENCE TO RELATED APPLICATIONS

This application is a continuation of U.S. patent application Ser. No. 16/535,703 filed on Aug. 8, 2019 and entitled LOW SODIUM SALT COMPOSITION, which is hereby incorporated by reference in its entirety.

FIELD OF THE INVENTION

This invention relates to food ingredients. In particular, this invention relates to food additives and ingredients that provide a low-sodium alternative to salt, e.g., sodium chloride, or "table salt." More specifically, this invention provides for salt particles adhered to a bulk carrier that provides a desired salt flavor using a reduced amount of sodium chloride as compared to conventional table salt. The salt particles adhered to a bulk carrier of the present invention are improved over prior alternative salts by having smaller salt particles adhered to a bulk carrier, which in turn, results in increased electrostatic forces that enable the alternative salt particles to adhere better to food. This disclosure also relates to improved methods for making the improved low-sodium salt alternatives having salt particles adhered to bulk carriers.

BACKGROUND

Table salt (sodium chloride) provides a taste that humans and other animals generally enjoy. Too much sodium, however, is known to cause certain adverse health effects such as high blood pressure and heart disease. Salt is a common ingredient used in food preparation and is also used as a condiment for finished foods such as cooked meats, vegetables, and snacks, e.g., popcorn. Processed and "fast food" items often contain high levels of salt to provide a desirable taste to the consumer; however, the short term benefit of so-called convenience foods can come with long-term, increased risk of heart attack or stroke. While the human body may require a salt for electrolyte balance and other physiological processes, in many cases people ingest sodium at levels that can be deleterious to their health.

Too much salt in the diet can give rise to adverse health consequences, e.g., high blood pressure which is a risk factor for stroke. As U.S. Pat. No. 9,491,961, noted, UK Government figures indicate that the average intake of salt per person is approximately 6.0-9.0 grams per day. However, the UK Government recommended maximum is 3 grams per day. Currently in the U.S., according to the FDA, the average adult consumption of sodium is 3,400 mg per day. As a result, according to the Centers for Disease Control, about 90% of Americans consume too much sodium. According to a 2019 study by the National Academy of Engineering, Sciences and Medicine, for individuals ages 14 and older, they recommend that individuals reduce sodium intakes if above 2,300 mg per day.

According to the World Health Organization, cardiovascular disease takes the lives of 17.9 million people per year and is responsible for 31% of global deaths. According to the Centers for Disease Control, "About 610,000 people die of heart disease in the United States every year—that's 1 in every 4 deaths." In the U.K., there are about 160,000 deaths from heart disease each year accounting for 26% of all deaths.

Clearly, a significant reduction by approximate 50% of current sodium consumption would be beneficial to human health and would save lives.

In principle, one way of reducing the amount of salt in a food product would be to mill the salt to give a very large surface area which should mean that the same "seasoning level" may be achieved using a lower amount of salt. However, as noted in U.S. Pat. No. 9,491,961, salt is hygroscopic and the finely milled salt quickly re-agglomerates unless protected using expensive or complex storage systems which would add additional cost to what is otherwise a commodity product.

U.S. Pat. No. 9,491,961 noted that another possibility is to replace at least a portion of the salt with a substitute. Alternatives to sodium chloride include the use of magnesium and potassium chlorides but these impart a bitter or metallic taste which is not generally acceptable to consumers. Furthermore the use of potassium and magnesium ions also affects neurons and can lead to changes in blood pressure. Other substitutes include organic molecules, such as monosodium glutamate (MSG), peptides and nucleic acid based substitutes. However these have their own problems. Thus, for example, there is a reported cancer risk associated with MSG. Additionally the substitutes may affect texture of the final finished food product and may have a potential to induce allergic responses. As a consequence, salt substitutes have replaced one "problem" with other issues and as a consequence found resistance within the food manufacturer sector and among public driven pressure groups.

Other solutions to this problem include producing alternative salt products comprising salt adhered to carrier particles. These salt-carrier products result in lower-sodium salt compositions that impart a salty taste with less sodium content than an equivalent volume of sodium chloride itself.

For example, U.S. Pat. No. 9,491,961 describes a method of preparing a salt product that comprises the steps of: (i) providing a mixture which comprises salt dissolved in a solvent, the mixture further containing an organic material that is solid under ambient temperature conditions; and (ii) atomizing the mixture and evaporating the solvent to produce a salt product comprised of individual crystallites of salt attached to hollow particles of organic material. The organic material may be a polymer such as a carbohydrate (e.g., maltodextrin or Gum Arabic). More than 95% of the resulting salt-carrier product particles produced using the methods described in U.S. Pat. No. 9,491,961 had a size of less than 50 microns.

U.S. Pat. No. 8,900,650 describes a salt composition including a carrier particle having disposed thereon a plurality of salt crystallites. The methods include providing an aqueous slurry comprising an aqueous solvent and a selected percent by weight of a solids mixture, wherein the solids mixture comprises salt and a carrier medium, and wherein the carrier medium is present in an amount between about 25% by weight and about 75% by weight of the aqueous solvent; and exposing the slurry to a drying process to both: a) form a carrier particle comprised of the carrier medium; and b) form a plurality of salt particles of an average size of less than about 20 microns on the surface of the carrier particle, with the salt particles on the surface of the carrier particle having an average size ranging from 100 nanometers to less than 2 microns.

The salt-carrier product described in U.S. Pat. No. 8,900,650 can be a bulking agent, carbohydrate or its derivative, starch, maltodextrin, hydrocolloid, protein, protein derivative, starch, pre-gelatinized starch, modified starch, pyrodextrin, gum, cereal flour, or tuber flour yeast extract, flavor enhancer, or lipid. The drying process can include freeze drying, spray drying, spray cooking, or roll drying process.

When applying these salt-carrier products to food, it is important that they coat the food well. As explained below, the inventors have determined that by altering the variables for production of salt adhered to carrier particles, including starting solid composition, salt-carrier slurry composition, inlet and outlet air drying temperature, slurry temperature, and moisture content control, the resulting salt-carrier product of salt adhered to carrier particles can be produced with much smaller salt particles of about 100 nanometers to less than 2 microns adhered to a carrier, which in turn improves electrostatic forces that help the salt-carrier product better coat a food product.

SUMMARY OF THE INVENTION

In a first aspect, an improved method of making a low-sodium, salt-carrier product having less sodium per unit volume than an equivalent unit volume of sodium chloride, is provided comprising an aqueous salt-carrier slurry comprising an aqueous solvent and a selected percent by weight of a solids mixture, wherein the solids mixture comprises salt and a carrier medium, and wherein the carrier medium is present in an amount between about 2.77% by weight and less than 25% by weight of the aqueous solvent, and wherein the salt is present in an amount between about 3.9% by weight and less than 25% by weight of the aqueous solvent; and exposing the slurry to a drying process to both: A) form a carrier particle comprised of the carrier medium; and B) form a plurality of salt particles of less than about 100 nanometers to less than 2 microns on the surface of the carrier particle.

In another embodiment, the drying process is spray drying, spray cooking, freeze drying or roll drying.

In another embodiment, the unit volume of sodium chloride and the unit volume of the salt alternative composition produce an approximately equivalent salt taste.

In another embodiment, the carrier medium is a bulking agent, carbohydrate or its derivative, starch, maltodextrin, hydrocolloid, protein, protein derivative, yeast extract, flavor enhancer, or lipid.

In another embodiment, the protein derivative is a protein derived from soy, wheat, or whey.

In another embodiment, the carbohydrate or its derivative is one or more of maltodextrin, starch, pre-gelatinized starch, modified starch, pyrodextrin, gum, cereal flour, or tuber flour.

In another embodiment, the salt is one or more of sodium chloride, potassium chloride, magnesium chloride, ammonium chloride, or magnesium sulfate.

In another embodiment, the drying process comprises spray-drying using a spray drier inlet temperature between about 360° F.±25° F. and a spray dryer outlet temperature of 200° F.±25° F.

In another embodiment, the aqueous slurry comprises the salt plus the carrier in an amount of about 10% to 36% by weight of the aqueous salt-carrier slurry and salt in an amount about 2.5% to less than 25% by weight of the aqueous salt-carrier slurry, wherein the aqueous salt-carrier slurry is prepared by heating the salt, the carrier, and water to a temperature of about 176° F.±10° F. until the water, salt, and carrier are substantially dissolved to a moisture content of about 1.2% to 5%.

In another embodiment, the method further comprises pumping the aqueous slurry through a nozzle to control moisture content to 1.2% to 5%.

In a second aspect, an improved salt-carrier product is formed by a process comprising providing an aqueous salt-carrier slurry comprising an aqueous solvent and a selected percent by weight of a solids mixture, wherein the solids mixture comprises salt and a carrier medium, and wherein the carrier medium is present in an amount between about 2.77% by weight and less than 25% by weight of the aqueous solvent, and wherein the salt is present in an amount between about 3.9% by weight and about 42% by weight of the aqueous solvent; and exposing the aqueous salt-carrier slurry to a drying process to both: A) form a carrier particle comprised of the carrier medium; and B) form a plurality of salt particles of an average size of less than about 100 nanometers to less than 2 microns on the surface of the carrier particle.

In another embodiment, the carrier medium is maltodextrin and the drying process is a freeze drying, spray drying, spray cooking, or roll drying process.

In another embodiment, the salt is a salt of sodium, chloride, potassium, or sulfate ion.

In another embodiment, the carrier medium is a bulking agent, carbohydrate or its derivative, hydrocolloid, protein, protein derivative, yeast extract, flavor enhancer, lipid, mineral, or salt.

In another embodiment, the carrier media comprises two or more different medium materials.

In another embodiment, the interior portion of the carrier particle is substantially devoid of the salt crystals.

In another embodiment, the aqueous salt-carrier slurry comprises the salt plus the carrier in an amount of about 10% to 36% by weight of the aqueous salt-carrier slurry and salt in an amount about 2.5% to less than 25% by weight of the aqueous salt-carrier slurry, wherein the aqueous salt-carrier slurry is prepared by heating the salt, the carrier, and water to a temperature of about 176° F.±10° F. until the water, salt, and carrier are substantially dissolved to a moisture content of about 1.2% to 5%.

In another embodiment, the salt carrier product adheres better to foods than salt that is not adhered to a carrier particle.

In another embodiment, the foods are potato chips. In another embodiment, the foods are corn chips.

In another embodiment, the foods are nuts.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. The materials, methods, and examples are illustrative only and not intended to be limiting. In case of conflict with terms used in the art, the present specification, including definitions, will control.

The details of one or more embodiments are set forth in the accompanying drawings and the description below. Other features, objects, and advantages will be apparent from the drawings and detailed description, and from the claims.

DETAILED DESCRIPTION

Figure 1:
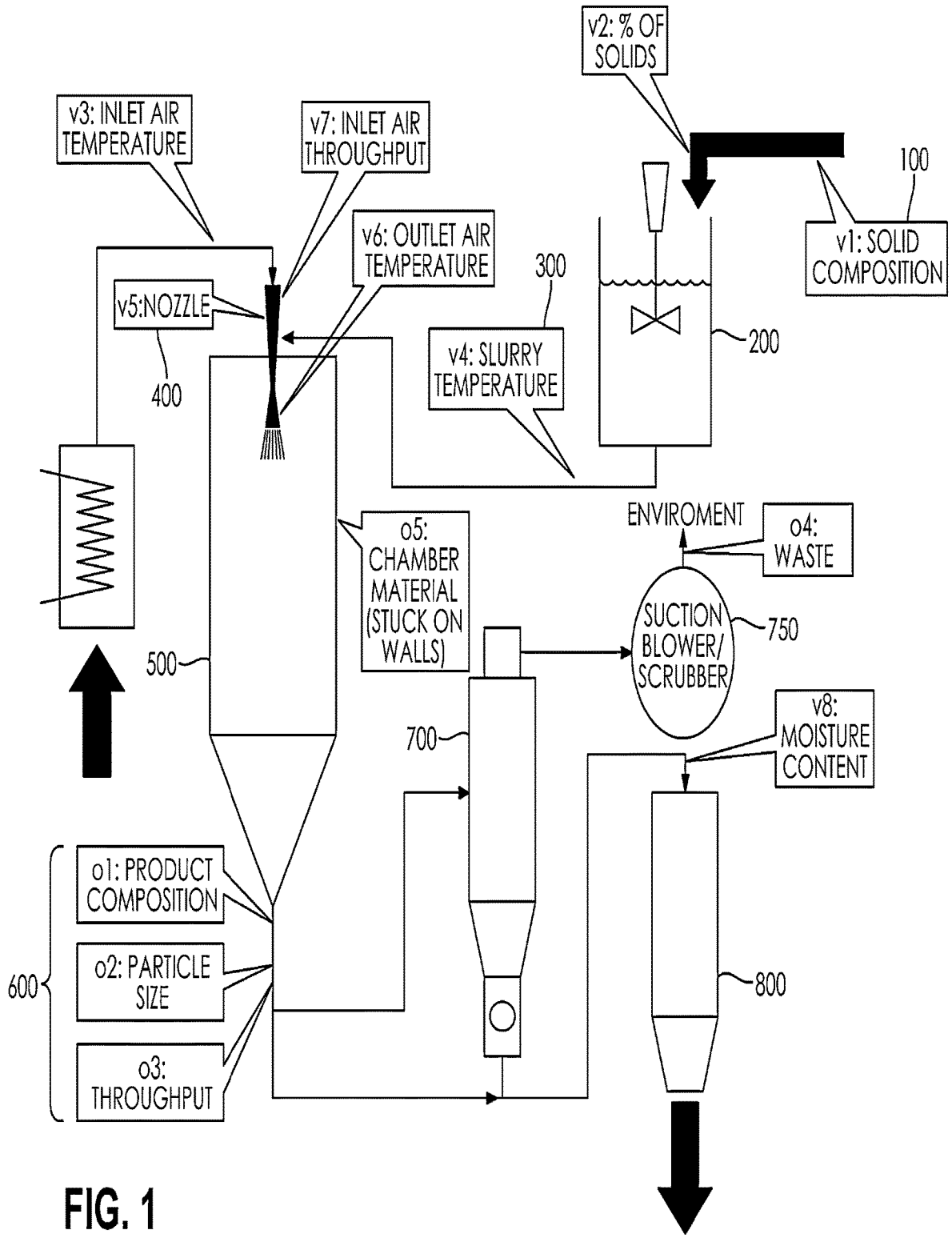
FIG. 1 is a schematic flow diagram depicting the process for making the improved salt-carrier product described herein.
Figure 2:
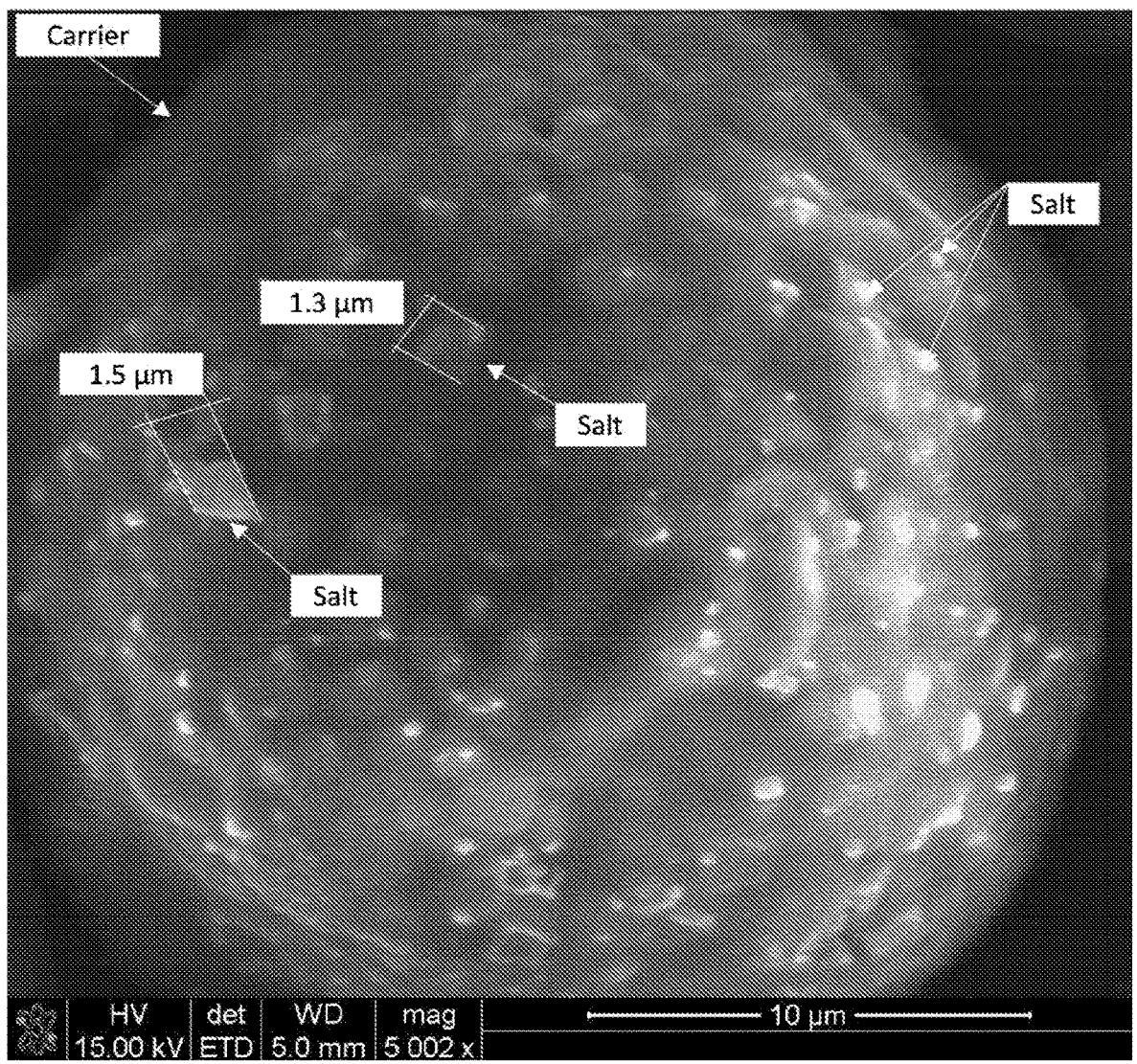
FIG. 2 is a scanning electron micrograph (SEM) of the improved salt-carrier product that depicts the size of the salt particles on an example of the improved salt-carrier product described herein.

For table-top or surface (sprinkle-on) applications, most commercially available salt is not immediately soluble in saliva because of its high density and relatively large particle size. When these particles are sprinkled on foods for immediate consumption or during further processing, they provide low intensity, long lasting, spotty salty taste. Most prepared foods are only briefly chewed and swallowed; thus, salt is sometimes added in a relatively high concentration to compensate for incomplete dissolution and the short mouth residence time. As a result, a consumer may ingest salt that is still in granule form and thereby consume far greater quantities of sodium than necessary to achieve a desired "salty" taste.

In general, a desired level of salty flavor can be achieved, while reducing sodium consumption, by providing small consumable salt particles having a large surface area-to-volume ratio. In general, the surface area-to-volume ratio of a particle increases as the size of the particle decreases. Thus, small salt particles provide increased interaction with saliva and sensory physiology in the mouth, e.g., tongue, cheeks, gums, etc., which can lead to an increased sensation of a salty taste. Because more of the salt particle surface is exposed to saliva, the dissolution rate of salt particles is greater as compared to regular, commercial-grade salt particles that one may find, e.g., at a restaurant. Because the residence time of food is relatively short in the mouth, increasing the dissolution rate of salt particles can have a pronounced effect on the sensation of salty taste.

As used herein, the phrases "nanometer- to micron-sized" or "nanometer-to micron-scale" and similar phrases carry their ordinary meaning, that is, they refer to objects having at least one dimension of nanometer or micron scale.

As used herein, the phrases "nanometer- to micron-sized" or "nanometer-to micron-scale" and similar phrases carry their ordinary meaning, that is, they refer to objects having at least one dimension of nanometer or micron scale. "Salt particles" can refer to a specific size, e.g., a narrow size distribution of particles, or a collection of particles of different sizes, e.g., a mean size for a population of salt particles.

Nanometer-to micron-sized salt particles are provided for direct application on prepared foods or in preparation of foods. In this and other embodiments, other ingredients can be added to the salt particles to achieve certain storage or use parameters, e.g., bulk density, flow, anti-caking, hydrophobicity, and other parameters. In some embodiments, a coagulating or wetting agent may be used to reduce the likelihood of producing an excess amount of dust when salt particles are applied to, or used in the preparation of foods.

In general, nanometer- to micron-sized salt particles can be adhered to a carrier to deliver the ultra-small salt particles to the consumer's mouth. The term "adhered" as used herein carries its ordinary meaning: to be joined or united, or attached. The processes involved in adhering salt particles to carriers can include chemical ionic and covalent bonding, surface tension, adhesion, and any other physical process that joins the two entities.

The term "adhered" as used herein carries its ordinary meaning: to be joined or united, or attached. The processes involved in adhering salt particles to carriers can include chemical ionic and covalent bonding, surface tension, adhesion, and any other physical process that joins the two entities.

"Salt" can be any type of salt, e.g., potassium chloride or a combination of salts. In certain preferred embodiments, "salt" refers to salts of sodium, chloride, potassium or sulfate ions. While the context of this disclosure focuses on providing low-sodium products for foodstuffs, the disclosed technology can be used for other purposes, including methods for introducing salts into living systems for medical or veterinary applications. In certain embodiments, the methods and products described herein can be used in applications where rapid introduction of sodium may be advantageous, e.g., in certain medical applications. Salts may include certain additives, e.g., minerals or other chemical elements; in some cases, the additives may provide certain health benefits.

Carriers can include, without limitation, bulking agents, cereal and tuber starches, maltodextrins, cereal and tuber flours, hydrocolloids, proteins, protein powders, including those from any plant or animal source, including, but not limited to cereals, tuber, dairy and whey powders; flavors, and seasonings, among others. Proteins can be any protein source from plant or animal, including dairy, meat, corn, etc. Carriers can vary in size and shape and can be processed from their original form (e.g., protein powders can be further refined or milled to a desired size) to provide a desired functionality, such as bulk flow or bulk density. In some embodiments, utilizing a carrier to deliver salt particles can provide certain packing, storage, and use benefits. For example, a carrier can be chosen to provide a desired bulk density for a particular salt-carrier product. In another example, a carrier may be chosen for its bulk flow characteristics in large-scale foods processing, or for its hydrophobic or hygroscopic properties. Maltodextrin has been determined to be a preferred carrier. A "salt-carrier product" refers to nanometer- or micron-scale salt particles adhered to a carrier.

In general, salt particles can be adhered to the surface of a carrier. The degree of salt coverage on the particle can be varied to produce various taste effects, including adjusting the intensity of a salty flavor. In addition, the bulk density of the salt, e.g., sodium chloride, in a salt-carrier product can be adjusted by controlling the salt coverage on the particle.

In general, the salt-carrier products described herein can be agglomerated to provide desirable properties related to use, storage, handling, and other considerations. For example, to reduce dust, salt-carrier products can include wetting agents or other additives to promote agglomeration of particles. Other additives can be used for obtaining a desired bulk density, product flow, antimicrobial, or other material handling parameter.

FIG. 1 is a schematic flow diagram of an exemplary process for making the improved salt-carrier product. A salt-carrier product can be made, according to one of many methods, by carrying out the following steps, which need not necessarily be performed in the order presented.

At step 100, a solid composition of salt and a carrier is prepared to create a salt-carrier slurry by adding a selected carrier, preferably maltodextrin, to water in a tank with good agitation and heating the tank to a temperature of 176° F.±10° F. to dissolve the carrier and then add the salt to the tank and continuing to heat the aqueous salt-carrier solution at a temperature of 176° F.±10° F. and agitating it for sufficient time to ensure the salt is dissolved and it becomes an aqueous salt-carrier slurry at step 300. Alternatively, the salt and carrier could be combined with the water and heated at different temperatures for different times, so long as the salt, carrier, and water are substantially dissolved to become an aqueous salt-carrier slurry.

The concentration of salt in the salt solution can be adjusted to provide a desired coverage of salt on the resulting salt-carrier product. The salt can include single salts (e.g., sodium chloride) or a mixture of salts (e.g., sodium chloride, potassium chloride, ammonium chloride, etc.). The carrier can be any bulking agent, e.g., a powdered bulking agent, including but not limited to proteins, carbohydrates or their derivative(s) (maltodextrin, pre-gelatinized starch, gums, cereal flours and the like), hydrocolloids, hydrolyzed proteins, yeast extracts, and flavorings. In some embodiments, a combination of different types of carriers can be used, e.g., a combination of a carbohydrate, a starch, and potassium salt can be used. The proportion of carrier to salt can be chosen to obtain a desired working density or other characteristic of the salt-carrier product. The salt-carrier mixture can then be mixed until homogeneous.

Examples of solid compositions used to create the salt-carrier slurry of the improved salt-carrier product include a salt plus carrier percent by weight of 11% to 39.9% of aqueous solvent (water); a salt percentage by weight of aqueous solvent (water) of 3.9% to less than 25%; a carrier percentage of 2.77% to 24.9% by weight aqueous solvent (water); a salt plus carrier percentage by weight of aqueous salt-carrier slurry of 10 to 39.9%; a salt percentage by weight of aqueous salt-carrier slurry of 2.5% to 14.9%.

At step 400, the an aqueous salt-carrier slurry fed into a nozzle of a drying chamber that has several orifices to spray out the slurry at different angles and drop sizes that can affect particle sizes into a drying chamber at step 500 with particle sizes inversely proportional to the angle aperture and directly proportional to the orifice aperture. The inlet temperature of the drying chamber is preferably 360° F.±25° F. Changing the amount of slurry that is pumped through the nozzle at step 400 can control the moisture content to 1.2% to 5%. Moisture content is the water content of the resulting product. The amount of slurry pumped through the nozzle into the drying chamber is controlled through the pump and compressor while slowed by the nozzle resistance (pressure drop).

The slurry should remain in the drying chamber until desired moisture content is reached and either precipitates to the collection hopper or is pulled by the cyclone as per regular Spray Drying practices, when they exit the outlet of the drying chamber at a temperature of 200° F.±25° F., followed by a cyclone at step 700 that collects the smaller particles that are too light to gravitate on the drying chambers hopper, a step particularly important as particle sizes of this process generates more smaller particles than typical spray drying processes. There is a suction blower/scrubber process at step 750 and a bagger process at step 800 that bags the resulting salt-carrier particles.

The salt-carrier mixture can then be subjected to a process to drive off (evaporate) water. In general, it can be advantageous to drive off water quickly, so as to reduce the growth time of salt nuclei that form on the surface of the carrier during the drying process. Exemplary processes for removing water from the carrier-slurry mixture include spray drying, spray cooking, freeze drying, and drum drying, among others.

In one approach, the average size of the salt particles can be controlled by adjusting parameters during the drying process, e.g., a spray-drying process, including one or more of (not by way of limitation): the ratio of salt-to-carrier in the slurry as described in the examples above, and spray drying parameters, including one or more of the inlet temperature, pump speed, air flow, and compressor pressure. It will be understood that various other means can be used to achieve similar results. Drying temperatures and times may vary particularly when methods other than spray drying are used in the drying process.

The improved process produces salt particles of an average size of 100 nanometers to less than 2 microns adhered to or on the surface of the carrier particles. FIG. 2 depicts an example of a salt-carrier product described herein with a salt particle size of 100 nm to less than 2 microns. Specifically, FIG. 2 is a SEM image of the improved salt-carrier product, demonstrating that the salt particles adhered to or on the surface of an exemplary carrier particle were measured to be 1.3 microns and 1.5 microns.

A number of illustrative embodiments have been described. Nevertheless, it will be understood that various modifications may be made without departing from the spirit and scope of the inventive concepts presented herein. For example, suitable carriers can include any material capable of providing a nucleation site for salt crystals. Examples include non-organic materials such as certain plastics and synthetic fillers known in the art.

In general, the methods provided herein can extend to other foods and food additives as well. For example, using similar processes as those described above, sugar particles can be grown on a suitable carrier to provide an analogous sugar-carrier product. Such an embodiment may provide a more intense sugar flavor than can be obtained with commercially-available sugar granules commonly found in restaurants, and may assist in lowering overall sugar intake. Those with certain adverse health conditions, such as diabetes or obesity may find such a sugar-carrier product beneficial to their health.

In general, the salt-carrier products (and their equivalents) described herein may be packaged for retail sale or for bulk shipments. The products described herein may be used for sprinkle-on applications, e.g., used in salt shakers and the like, and in bulk applications such as large-scale food processing. The salt-carrier products described herein may be used as flavorings, tenderizers, flavor enhancers, additives, fillers, and other ingredients generally known to those who prepare and consume foods, e.g., chefs, those in the food preparation industry, and consumers. Accordingly, other embodiments are within the scope of the following claims.

To gain consumer loyalty in a competitive snack food market, companies need to consistently produce well-coated potato chip products. Toward this end, it is important to understand how seasoning adheres to food surfaces so that we can improve the process involved in coating snacks. The adhesion of salt onto potato chips affects the product's flavor and impacts whether consumers will purchase the product.

Scientists at The Ohio State University examined a number of factors that could impact how salt adheres to potato chips: surface oil content (SOC), chip temperature, the time between frying and coating the product, oil composition, salt particle size, salt crystal shape and the use of electrostatics. It appears that the best adhesion conditions would involve applying small salt particles to an oily surface. "Optimize the adhesion of salt onto potato chips," *The Free Library.* 2008 Food Technology Intelligence, Inc. 30 Jun. 2019.

Investigators produced chips with three different SOC levels—high, low and no SOC. Patting fried chips with a paper towel reduced SOC levels. Extracting fried chips with hexane removed SOC. Baking fried chips increased chip temperature.

The researchers fried chips in soybean, olive, corn, peanut and coconut oils to study the effects of oil composition. The non-electrostatically coated NaCl crystals of five different particle sizes and three different shapes onto the chips. Using a powder applicator, five different sizes of salt were electrostatically applied onto all SOC chips. A feeder, which simulates a moving conveyor belt used in commercial settings, removed the salt.

Chips with high SOC had the highest adhesion of salt, making SOC the most dominant factor. Increasing chip temperature increased SOC and adhesion activity. Increasing the time between frying and coating the chip reduced the extent of adhesion for low-SOC level chips, but did not affect high- and non-SOC chips. Changing oil composition did not change adhesion values.

Increasing the size of the salt particles decreased the extent of adhesion on all SOC chips. The effect of salt size was most evident in lower SOC chips. The larger-shaped crystals adhered less extensively than smaller-shaped crystals on all SOC chips, except for large cubic-shaped crystals on low-SOC chips. For chips with low SOC levels or none at all, cubic-shaped crystals gave the best adhesion properties. Electrostatic coating improved adhesion values for all salt sizes.

The relationship between salt particle size and adhesion has also been noted by Amos Nussinovitch, Adhesion in Foods (2017). Ertran Ermiss in his Ph.D. thesis at Greenwich University of Greenwich, entitled Establishment of a Repeatable Test Procedure for Measuring Adhesion Strength of Particles In Contact With Surfaces (2011), noted that the electrostatic force between a seasoning particle and a crisp substrate could be calculated as follows:

Calculation of Electrostatic Force ($F_{el}$)

The electrostatic interaction between the seasoning particle and the crisp substrate can be considered as coulombic interaction between two oppositely charged particles situated on both side of the surface and is given by (Bowling, 1988)

$$F_{el} = \frac{q^2}{48\pi\varepsilon_r (R_{p+h})^2}$$

Where q is the net change of the seasoning particle, $\varepsilon_0$ is permittivity of vacuum (electric constant). $\varepsilon_r$ is the dielectric constant of the intervening medium (oip in this case). $R_p$ is equivalent radius of particle and h is the surface-to-surface distance of separation. Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on this application based hereon. Accordingly, the disclosure of the embodiments of the invention is intended to be illustrative, but not limiting, of the scope of the invention.

The improved salt-carrier product adheres better to foods and coats foods, including potato chips, corn chips, nuts, and other snack chips, better than salt that is not adhered to a carrier particle. Adhering better to foods means that there is less salt-carrier product by volume that does not adhere to the foods than salt not adhered to a carrier particle when an approximately equal volume of salt not adhered to a carrier product and the improved salt-carrier product are applied to the same foods.

The invention has been described in terms of particular embodiments. The alternatives described herein are examples for illustration only and not to limit the alternatives in any way. The steps of the invention can be performed in a different order and still achieve desirable results. It will be obvious to persons skilled in the art to make various changes and modifications to the invention described herein. To the extent that these variations depart from the scope and spirit of what is described herein, they are intended to be encompassed therein. It will be understood by those skilled in the art that various changes in form and details may be made therein without departing from the scope of the invention encompassed by the appended claims.

What is claimed is:

1. A salt-carrier product formed by a process comprising:
   providing an aqueous salt-carrier slurry comprising an aqueous solvent and a selected percent by weight of a solids mixture, wherein the solids mixture comprises a salt present in an amount between about 3.9% by weight and less than 25% by weight of the aqueous solvent, and a carrier medium present in an amount between about 2.77% by weight and less than 25% by weight of the aqueous solvent, wherein the aqueous salt-carrier slurry comprises the salt plus the carrier in an amount of about 10% to 36% by weight of the aqueous salt-carrier slurry, wherein the aqueous salt-carrier slurry is prepared by heating the salt, the carrier, and water to a temperature of about 176° F.±10° F. until the water, salt, and carrier are substantially dissolved to a moisture content of about 1.2% to 5%; and
   exposing the aqueous salt-carrier slurry to a drying process to both: A) form a carrier particle comprised of the carrier medium; and B) form a plurality of salt particles of an average size of less than 100 nanometers on the surface of the carrier particle;
   wherein the salt carrier product adheres better to foods than salt that is not adhered to a carrier particle.

2. The salt-carrier product of claim 1, wherein the carrier medium is maltodextrin and the drying process is a freeze drying, spray drying, spray cooking, or roll drying process.

3. The salt-carrier product of claim 2, wherein the salt is a salt of sodium, chloride, potassium, or sulfate ion.

4. The salt-carrier product of claim 3, wherein the carrier medium is a bulking agent, carbohydrate or its derivative, hydrocolloid, protein, protein derivative, yeast extract, flavor enhancer, lipid, mineral, or salt.

5. The product of claim 4, wherein the carrier medium comprises two or more different medium materials.

6. The product of claim 4, wherein the carrier particle has an interior portion substantially devoid of salt crystals.

7. The salt-carrier product of claim 6, wherein the foods are selected from the group consisting of potato chips, corn chips, and nuts.

8. The salt-carrier product of claim 1, wherein exposing the aqueous salt-carrier slurry to the drying process is followed by a cyclone process.

9. The salt-carrier product of claim 1, wherein the aqueous salt-carrier slurry comprises the salt plus the carrier in an amount of about 15% to 35% by weight of the aqueous salt-carrier slurry.

10. The salt-carrier product of claim 1, wherein the aqueous salt-carrier slurry comprises the salt plus the carrier in an amount of less than 36% by weight of the aqueous salt-carrier slurry.

11. The salt-carrier product of claim 1, wherein the salt is present in an amount between about 3.9% by weight and less than 14.9% by weight of the aqueous solvent.

12. The salt-carrier product of claim 1, wherein the drying process comprises spray-drying using a spray drier outlet temperature of 200° F.±25° F.

13. A salt-carrier product formed by a process comprising:
providing an aqueous salt-carrier slurry comprising an aqueous solvent and a selected percent by weight of a solids mixture, wherein the solids mixture comprises a salt present in an amount between about 2.5% by weight and less than 14.9% by weight of the aqueous solvent, and a carrier medium present in an amount between about 2.77% by weight and less than 25% by weight of the aqueous solvent, wherein the aqueous salt-carrier slurry comprises the salt plus the carrier in an amount of about 10% to 36% by weight of the aqueous salt-carrier slurry, wherein the aqueous salt-carrier slurry is prepared by heating the salt, the carrier, and water to a temperature of about 176° F.±10° F. until the water, salt, and carrier are substantially dissolved to a moisture content of about 1.2% to 5%; and
exposing the aqueous salt-carrier slurry to a drying process to both: A) form a carrier particle comprised of the carrier medium; and B) form a plurality of salt particles of an average size of less than 100 nanometers on the surface of the carrier particle;
wherein the salt carrier product adheres better to foods than salt that is not adhered to a carrier particle.

14. The salt-carrier product of claim 13, wherein the drying process comprises spray-drying using a spray drier outlet temperature of 200° F.±25° F. and the drying process is followed by a cyclone process.

15. The salt-carrier product of claim 13, wherein the aqueous salt-carrier slurry comprises the salt plus the carrier in an amount between about 10% and less than 36% by weight of the aqueous salt-carrier slurry.

16. The salt-carrier product of claim 13, wherein the aqueous salt-carrier slurry comprises the salt plus the carrier in an amount of about 15% to 35% by weight of the aqueous salt-carrier slurry.

17. The salt-carrier product of claim 13, wherein the carrier medium is maltodextrin and the drying process is a freeze drying, spray drying, spray cooking, or roll drying process.

18. The salt-carrier product of claim 17, wherein the salt is a salt of sodium, chloride, potassium, or sulfate ion.

19. The salt-carrier product of claim 18, wherein the carrier medium comprises two or more carriers selected from the group consisting of a bulking agent, carbohydrate or its derivative, hydrocolloid, protein, protein derivative, yeast extract, flavor enhancer, lipid, mineral, or salt.

20. The salt-carrier product of claim 13, wherein the foods are selected from the group consisting of potato chips, corn chips, and nuts.

\* \* \* \* \*